No. 870,105. PATENTED NOV. 5, 1907.
J. W. IMPECOVEN.
VEHICLE COUPLING.
APPLICATION FILED MAR. 18, 1907.

WITNESSES:
D. E. Carlsen
E. C. Carlsen.

INVENTOR.
JOHN W. IMPECOVEN.
BY his ATTORNEY:
A. M. Carlsen.

UNITED STATES PATENT OFFICE.

JOHN W. IMPECOVEN, OF KIDDER, SOUTH DAKOTA.

VEHICLE-COUPLING.

No. 870,105.

Specification of Letters Patent.

Patented Nov. 5, 1907.

Application filed March 18, 1907. Serial No. 362,911.

*To all whom it may concern:*

Be it known that I, JOHN W. IMPECOVEN, a citizen of the United States, residing at Kidder, in the county of Marshall and State of South Dakota, have invented a new and useful Vehicle-Coupling, of which the following is a specification.

My invention relates to vehicle couplings; and the object is to provide a strong, convenient and reliable coupling by which a traction engine may be coupled to separators and other wheeled machines or vehicles to be drawn by the engine.

This and other objects I attain by the novel construction and arrangement of parts illustrated in the accompanying drawing, in which—

Figure 1:
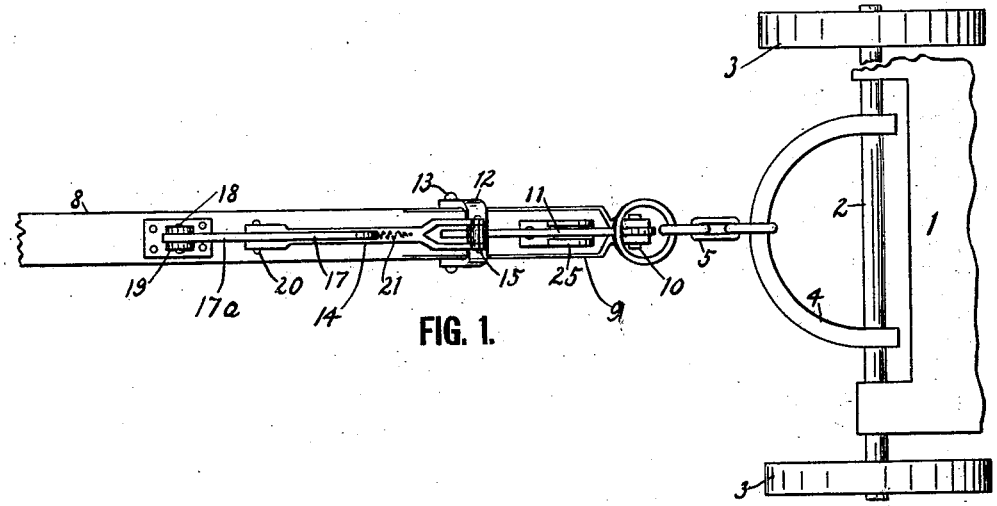
Figure 2:
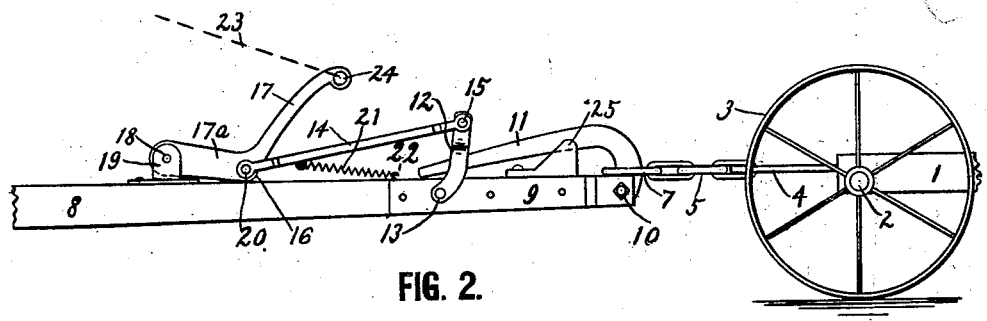
Figure 3:

Figure 1 is a top or plan view of my improved coupling shown as applied to couple together the rear portion of the tender of a traction engine and the front end of a tongue or pole of a separator or other vehicle. Fig. 2 is a side elevation of Fig. 1. Fig. 3 is a detail top view of the guard 25 in Fig. 1.

Referring to the drawing by reference numerals, 1 designates the rear portion of the frame, 2 is the axle and 3 the wheels of the tender usually attached to the rear end of a traction engine. Said shaft 2 is provided with a clevis or like contrivance 4, by which other vehicles are drawn. To said clevis I secure by a chain 5 of any desired length, a ring 7, which is adapted for engagement with the coupling fixed on the pole 8 of the threshing machine, separator or other vehicle to be drawn.

The coupling consist of a metallic frame piece 9 fixed on the end of the pole and having to its front end pivoted at 10 a curved, almost L-shaped lever 11, in whose curve the ring 7 is held when the lever is folded rearwardly upon the pole. In the latter position the lever is held by a clevis 12, pivoted at 13 to the beam and held by a link-rod 14 in the upright position in which it straddles the lever 11. The link-rod 14 is pivoted at 15 with its front end to the clevis, and has its rear end pivoted at 20 to the depending curve 16 of a trip-lever 17—17ª, whose lower end is pivoted at 18 in a bracket 19 fixed upon the pole; said pivot joint 18 being vertically in a higher position than the joint 20 when the trip lever is resting upon the pole and also leans forwardly, the clevis 12 is practically locked in its upright position against being thrown backward by jarring; such locking is further completed by having a coil spring 21 secured with one end to the link 14 and the other to a hook 22 fixed on the pole.

To a better understanding of the nature of the mechanism, 14 and 17ª may be considered as two links with a knee-joint 20 resting on the pole at a point lower than the joints 15 and 18; and 17 is an arm on one of the links.

In operating the device, a cord cable or chain 23 is secured in the hole 24 of the arm and extended to the person riding on the separator or other vehicle drawn, so that whenever he so wishes he may pull on the rope and thus uncouple from the tender by pulling lever 17 link 14 and clevis 12 rearwardly so that the chain 5 and ring 7 may swing the lever 11 in a forwardly-pointing direction and escape from it.

25 is a guarding block secured upon the pole, to prevent the ring 7 from moving accidentally too far back on the lever 11; the guard is preferably bifurcated so as to straddle the lever 11 and thus close contact with it even when it may get worn or have some play in it. To couple again, the ring 7 is placed on the lever 11 and the latter is folded rearwardly while the clevis 12 is held rearward and then the clevis is allowed to be drawn by the spring 21 into locking position again with the trigger.

Having thus described my invention, what I claim is;—

1. In a coupling of the class described, the combination with an elongated frame piece adapted to be secured on the front end of the pole of the drawn vehicle, an L-shaped lever pivoted to the front end thereof and adapted to have its long arm folded rearwardly upon the pole, a ring adapted to engage in the curve of said lever, a chain or like means securing said ring to the motor vehicle or its tender, and means for locking the L-shaped lever in said position; said locking means consisting of a clevis pivoted at the sides of the pole and engaging with its arch the L-shaped lever, a bracket fixed upon the pole in rear of the clevis a pair of links pivoted together to form a knee-joint normally resting upon the pole and having their other ends pivoted, one to the clevis and the other to the bracket at points higher than the knee-joint, one of the links having an arm by which to throw the knee-joint upward when the clevis is to release the L-shaped lever.

2. In a coupling of the class described, the combination with an elongated frame piece adapted to be secured on the front end of the pole of the drawn vehicle, an L-shaped lever pivoted to the front end thereof and adapted to have its long arm folded rearwardly upon the pole, a ring adapted to engage in the curve of said lever, a chain or like means securing said ring to the motor vehicle or its tender, and means for locking the L-shaped lever in said position; said locking means consisting of a clevis pivoted at the sides of the pole and engaging with its arch the L-shaped lever, a bracket fixed upon the pole in rear of the clevis a pair of links pivoted together to form a knee-joint normally resting upon the pole and having their other ends pivoted, one to the clevis and the other to the bracket at points higher than the knee-joint, one of the links having an arm by which to throw the knee-joint upward when the clevis is to release the L-shaped lever, and a spring acting on the links to hold them downward against accidental uncoupling.

3. In a coupling of the class described, the combination with an elongated frame piece adapted to be secured on the front end of the pole of the drawn vehicle, an L-shaped lever pivoted to the front end thereof and adapted to have its long arm folded rearwardly upon the pole, a ring adapted to engage in the curve of said lever a chain or like means securing said ring to the motor vehicle or its tender, and means for locking the L-shaped lever in said position; and a guard fixed upon the pole to keep the ring in the curved part of the lever.

In testimony whereof I affix my signature, in presence of two witnesses.

JOHN W. IMPECOVEN.

Witnesses:
  Gus N. Norman,
  Oscar Harlan.